(12) United States Patent
Prodic

(10) Patent No.: US 7,759,921 B2
(45) Date of Patent: Jul. 20, 2010

(54) DIGITAL CONTROLLER FOR DC-DC SWITCHING CONVERTERS FOR OPERATION AT ULTRA-HIGH CONSTANT SWITCHING FREQUENCIES

(75) Inventor: Aleksandar Prodic, Toronto (CA)

(73) Assignee: NXP B.V., Eindhoven (NL)

( * ) Notice: Subject to any disclaimer, the term of this patent is extended or adjusted under 35 U.S.C. 154(b) by 145 days.

(21) Appl. No.: 11/576,433

(22) PCT Filed: Oct. 3, 2005

(86) PCT No.: PCT/CA2005/001507

§ 371 (c)(1),
(2), (4) Date: Aug. 19, 2008

(87) PCT Pub. No.: WO2006/037214

PCT Pub. Date: Apr. 13, 2006

(65) Prior Publication Data

US 2008/0303501 A1 Dec. 11, 2008

(30) Foreign Application Priority Data

Oct. 1, 2004 (CA) .................................... 2483378

(51) Int. Cl.
*G05F 1/00* (2006.01)
(52) U.S. Cl. ..................................................... 323/283
(58) Field of Classification Search .................. 323/283, 323/284, 222, 224
See application file for complete search history.

(56) References Cited

U.S. PATENT DOCUMENTS

| 6,984,967 | B2 * | 1/2006 | Notman ....................... 323/282 |
| 7,286,009 | B2 * | 10/2007 | Andersen et al. .............. 330/10 |
| 7,449,869 | B2 * | 11/2008 | Markowski .................. 323/283 |
| 7,456,621 | B2 * | 11/2008 | Leung et al. ................. 323/283 |
| 7,498,781 | B2 * | 3/2009 | Canfield et al. ............. 323/280 |

* cited by examiner

*Primary Examiner*—Shawn Riley

(57) ABSTRACT

A digital controller for low-power DC-DC switch mode power supplies (SMPS) suitable for on-chip implementation and use in portable battery-powered systems is provided. The digital controller allows operation at ultra high constant switching frequencies and can be implemented with a simple low-power digital hardware. The digital controller includes a digital pulse width modulator (DPWM), based on a multibit $2^{nd}$ orders sigma-delta ($\Sigma$-$\Delta$) principle, and a dual-sampling mode PID compensator. The output voltage is either sampled at a frequency lower than the switching frequency (undersampled) or sampled at the switching rate. In steady-state, undersampling results in reduced power consumption, while during transients, sampling at the switching rate provides fast transient response. Another aspect of the present invention is a dual sampling/clocking scheme, which is relied on by the DPWM described. A method is also provided for controlling low power DC-DC switch mode power supplies operating at high constant switching frequencies.

33 Claims, 15 Drawing Sheets

DIGITAL CONTROLLER FOR DC-DC SWITCHING CONVERTERS FOR OPERATION AT ULTRA-HIGH CONSTANT SWITCHING FREQUENCIES

FIELD OF THE INVENTION

This invention relates to a digital device and a method of controlling supply voltage in low-power portable devices.

BACKGROUND OF THE INVENTION

Analog controlled switch-mode power supplies (SMPS) are used in low power devices such as cell phones, portable data assistants, and MP3 players, to transfer variable supply (i.e. battery) voltage to a constant output value. The regulation is performed through the interaction of an analog controller and direct-current to direct-current (DC-DC) switching power converter. The task of the controller is to monitor the output voltage and provide appropriate low-power pulse-width modulated control signals for the switching converter, which efficiently processes power. To allow small weight and size of the overall system, it is usually desirable that the controller produces signals at a high constant frequency (switching frequency $f_{sw}$) that does not interfere with the proper operation of the supplied device. In the existing portable devices dedicated analog integrated circuits (IC-s) are generally used to perform the control task. The analog controllers are fast and have low-power consumption but also suffer from many problems. They generally require a long and tedious design process and often need to be completely redesigned each time IC implementation technology changes, and as such are not flexible and unsuitable for the integration with fast changing digital hardware on which the majority of portable devices is based. In addition, the analog controllers are sensitive to temperature changes, variations in manufacturing process, and aging.

Digital control of low-power switch SMPS can result in significant improvements of system characteristics. It offers advantages such as simple introduction of advanced control laws and power management techniques, use of automated design tools that enable faster development and implementation, low sensitivity to external influences and parameter variations, realization with a small number of external passive components, and design portability, which allows simple transition from one to another, more advanced, IC implementation technology. All of these are highly desirable features in modern portable applications that need to be implemented with a miniature power-efficient hardware.

Modern tools for automatic digital design allow fast development process and simple transfer of designs from one implementation technology to another. In addition, the digital implementation benefits from superior flexibility. The same hardware can perform many different functions and existing designs can be easily altered to better suit other applications.

The digital hardware also shows lower susceptibility to external influences, such as change of temperature or aging. The operation of a digital system usually remains unchanged in all working conditions.

Moreover, the digital control also allows simple implementation of power savings (management) techniques based on voltage scaling that result in significant extension of the battery life. In those techniques, to allow minimal power consumption, the supply voltage of the device is changed in accordance with its processing load. Using digital hardware, these techniques can be implemented without a significant increase in system complexity. It can be done through simple communication with a digital microprocessor, which is a standard part of most modern portable devices. Implementation of the power savings techniques with analog hardware is a complex task. It requires additional hardware, and could increase power consumption and the size of the device.

Although the abovementioned advantages of the digital control are known, in low-power applications, analog pulse-width modulated (PWM) controllers are almost exclusively used. The main reasons for the sporadic use of digital controllers is their power consumption and much lower switching frequency compared to their analog counterparts. Power consumption of digital hardware is proportional to the product of switching frequency and size of the hardware (on-chip area) and in the existing solutions often exceeds the power consumed by the output load. As a result, overall efficiency of digitally controlled SMPS is poor. The lower switching frequency generally results in a larger, heavier, and more expensive power stage that can negate some or all of the abovementioned advantages of digital control.

The inferior performance of digitally controlled SMPS in low power applications is mainly caused by slow and power inefficient operation of basic functional blocks, digital pulse-width modulator, compensator and analog-to-digital controller. Recent products and publications (References 1-4 below) demonstrate digital controllers with improved performance. They allow introduction of digitally controlled SMPS in larger portable systems, such as laptop computers, and camcorders, but are still not suitable for smaller portable devices. For the targeted applications, they still have high power consumption and operate at relatively low switching frequencies. The maximum frequency of these solutions is between 400 kHz and 1 MHz, significantly lower than the switching frequency of readily available analog controllers that operate at frequencies up to 5 MHz (References 5-6 below). The known digital controllers will also not be able to operate with upcoming SMPS that, in near future, are expected to operate at switching frequencies significantly higher than 10 MHz.

Therefore what is needed is a device and method of digital control of low-power SMPS having low power consumption and being able to operate at switching frequencies even beyond 10 MHz (ultra-high switching frequency).

SUMMARY OF THE INVENTION

The present invention advances the art and helps overcome the aforementioned problems by providing a fast, low-power digital SMPS controller that can operate at programmable switching frequencies from 1 to 12 MHz. The solution can also be easily modified to operate at even higher frequencies. Simulations show that it can operate at about 120 MHz with optimization, and a DPWM was constructed that operates at 60 MHz. Implemented with the commonly used FPGA systems 1, the new controller can produce pulse-width modulated signals at frequencies up to 60 MHz with high 9-bit resolution. If on chip implementation is selected, the frequency range can easily be further expanded. The present invention can be implemented with digital logic gates only, or with a combination of digital gates and a minimal number of very simple analog components. In the latter case, the analog components can be used for the further power and size reduction, and can be developed in a small fraction of time needed for conventional analog designs.

One aspect of the present invention is a novel digital controller for low-power DC-DC switch mode power supplies (SMPS) suitable for on-chip implementation and use in portable battery-powered systems. The controller allows operation at ultra high constant switching frequencies and can be implemented with simple low-power digital hardware. These benefits are achieved by combining a newly designed digital pulse width modulator (DPWM), based on the second-order multi-bit sigma-delta (Σ-Δ) principle, with a dual-sampling mode PID compensator. The output voltage is either sampled at a frequency lower than the switching frequency (undersampled) or sampled at the switching rate. In steady-state, undersampling results in reduced power consumption, while during transients, sampling at the switching rate provides fast transient response.

Another aspect of the present invention is a dual sampling/clocking scheme, which is relied on by the DPWM described, but also has application beyond the particular DPWM described. Accordingly, another aspect of the invention is a device and method for controlling a dual sampling/clocking mode.

Yet another aspect of the present invention is a method for digital control of SMPS that enables power efficient operation at constant switching frequencies significantly higher than 10 MHz.

BRIEF DESCRIPTION OF THE DRAWINGS

A detailed description of the preferred embodiments is provided herein below by way of example only and with reference to the following drawings, in which.

DETAILED DESCRIPTION

Figure 1:
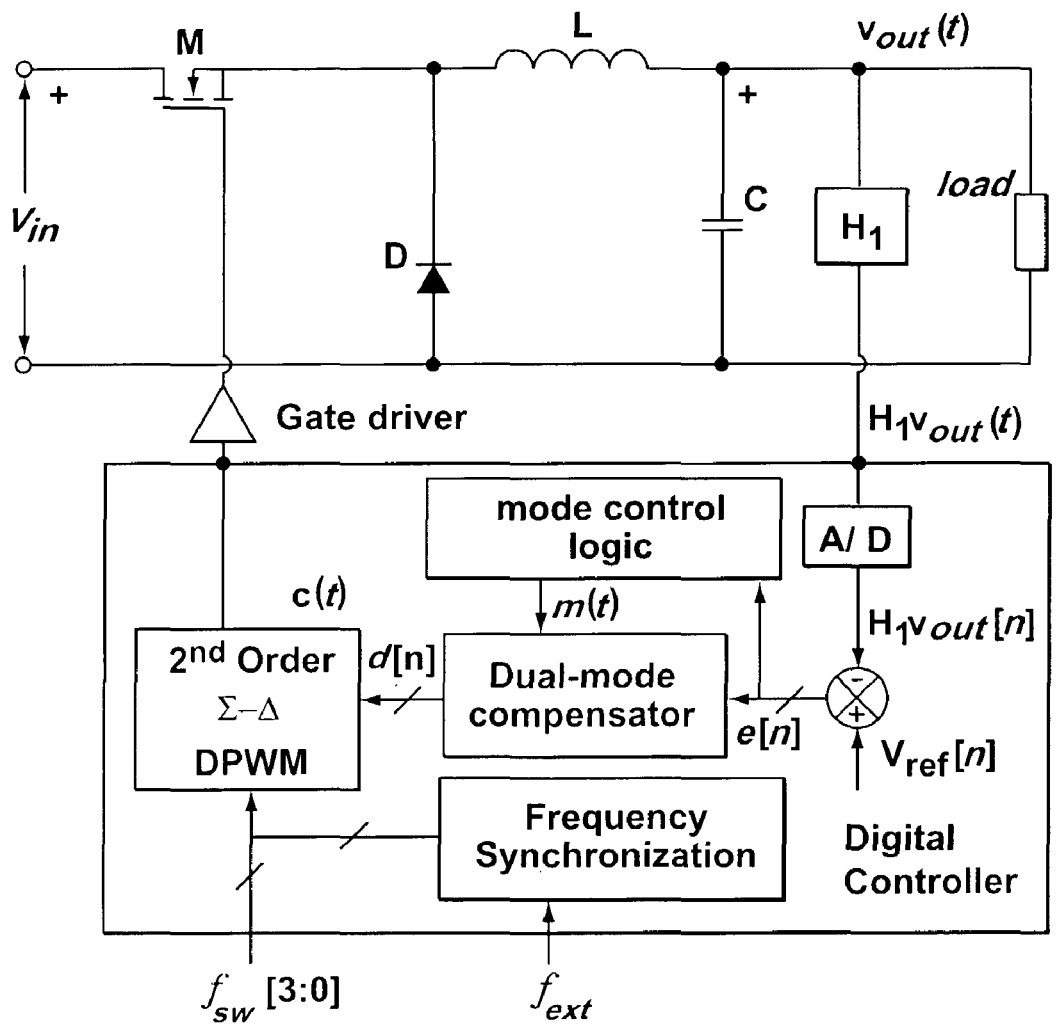
FIG. 1 is a block diagram of a buck converter regulated with the digital controller of the present invention.

FIG. 1 shows a block diagram of a DC-DC (direct-current to direct-current) buck switching converter regulated by the controller of the present invention. The controller combines the novel DPWM of the present invention that is in part based on the multi-bit sigma-delta principle used in A/D and D/A conversions, and on a novel dual-sampling/clocking control scheme to achieve high switching frequency and low power consumption using a simple hardware.

The representative buck converter of FIG. 1 transforms the input voltage to a lower output value by switching transistors M at constant switching rate $f_{sw}$=1/$T_{sw}$, and by changing the portion of the switching period during which the transistor is in on state. The ratio of the transistor "on time" and the whole switching period, D=$t_{on}$/Ts, is defined as duty ratio. The pulsating waveform at the output of the transistor is passed to the output LC filter, to eliminate high-frequency component and obtain DC voltage required by the load.

The regulation of the output voltage $v_{out}$(t) is performed as follows. Analog-to-digital converter (A/D) transforms attenuated analog output voltage H$v_{out}$(t) into its digital equivalent H$v_{out}$[n]. The attenuation is usually performed to reduce the output voltage to the appropriate value for the A/D. In some cases, when the regulated output voltage is low enough, a direct connection to the input of the A/D is possible. The digital equivalent is then compared with a desired reference value $V_{ref}$[n] forming an error signal e[n], which is passed to the digital dual-mode compensator and mode control circuit. The compensator processes error signal and creates digital control signal d[n], which is the input for the $2^{nd}$ order multi-bit DPWM. The DPWM transfers the control value into pulse-width modulated signal c(t) which duty ratio is proportional to d[n].

The control value d[n] depends not only on the error signal e[n] but also on the pervious error and control values e[n−1], e[n−2], and d[n−1], respectively. In general, when the error signal is negative, meaning the output voltage is higher than the reference, the compensator reduces d[n] resulting in a decrease of the output. When the output voltage is lower a reverse action is performed.

Preferably, the controller and switching converter are connected through a gate driver that amplifies low power controller signal to the level appropriate for the power transistor.

Low-Power Ultra-High Frequency Digital Pulse-Width Modulator Based on $2^{nd}$-Order Multi-Bit Sigma-Delta Principle In low-power DC-DC SMPS the digital pulse-width modulator (DPWM) needs to provide not only high frequency signals using minimal amount of power but also should be able to precisely regulate the signal's duty ratio value (i.e. should have high resolution). For the reasons explained in References 8, 9 listed below, the high resolution of the DPWM is necessary for accurate output voltage regulation and operation of the power supply without undesirable "limit-cycle" oscillations at the output.

Design of a high-resolution high-frequency DPWM has proven to be a challenging task (as illustrated in Reference 10 below). Prior art solutions present various architectures that make design tradeoffs between on-chip area and power consumption, or between switching frequency and the resolution of the DPWM. Conventional designs using a counter require a clock signal at a frequency that is in most applications significantly higher than the switching frequency and hence generally exhibit high power dissipation when both high frequency and high resolution are required. Designs that include a ring oscillator (delay cells) and a multiplexer have substantially lower power consumption but generally require a large on-chip area (i.e. large multiplexers) for the creation of high-resolution signals.

Recently presented architectures, such as hybrid, delay-locked loop, and segmented delay-line either combine the two previous concepts or operate with a different arrangement of the delay cells. These solutions demonstrate high-resolution operation (8-10 bits) at frequencies up to 1 MHz and operation with a decreased resolution at higher frequencies. The resolution and maximum frequency of these solutions are limited by the propagation time, i.e. time step, of a delay cell and the number of cells included in the ring.

To improve effective resolution of the DPWM, in accordance with one particular embodiment of the invention, digital dither can be introduced, in accordance with the prior art. However, this implementation requires use of relatively large look-up tables, and requires a relatively long averaging sequence for significant improvement of the effective DPWM resolution. In addition, this implementation introduces large low frequency oscillations at the output and as such has proven to be impractical for low power applications In several other solutions sigma-delta ($\Sigma$-$\Delta$) modulators are used as parts of power digital-to-analog converters, switch-mode amplifiers (as explained in Reference 10) or SMPS (as particularized in Reference 11). In the power amplifiers and digital-to-analog converters, a single bit sigma-delta modulator is usually used. It produces a set of digital ones and zeros in which the average value, over a large number of cycles, is equal to the desired high-resolution input value. This single-bit approach is generally not suitable for low power SMPS. The signal sequence produced by a single-bit $\Sigma$-$\Delta$ modulator has a variable frequency that can interfere with noise-sensitive battery powered devices. In addition, the variable frequency causes higher current stress on the switching converter, introduces additional losses, and requires significant over design of the expensive power stage. The solutions that combine a lower resolution multi-bit DPWM (core DPWM) and first-order $\Sigma$-$\Delta$ to achieve constant switching frequency (as shown in Reference 11 below) only partially eliminate the noise problem and usually result in a minor improvement of the effective resolution. In these solutions the $1^{st}$ order $\Sigma$-$\Delta$ introduces tones (undesirable low frequency signals) (as described in Reference 12 below) the amplitude of which is undesirably large when the resolution of the core DPWM is low. Moreover, in these solutions, to perform averaging, the compensator is slowed down and dynamic (speed) of the control loop is usually compromised.

Figure 2:
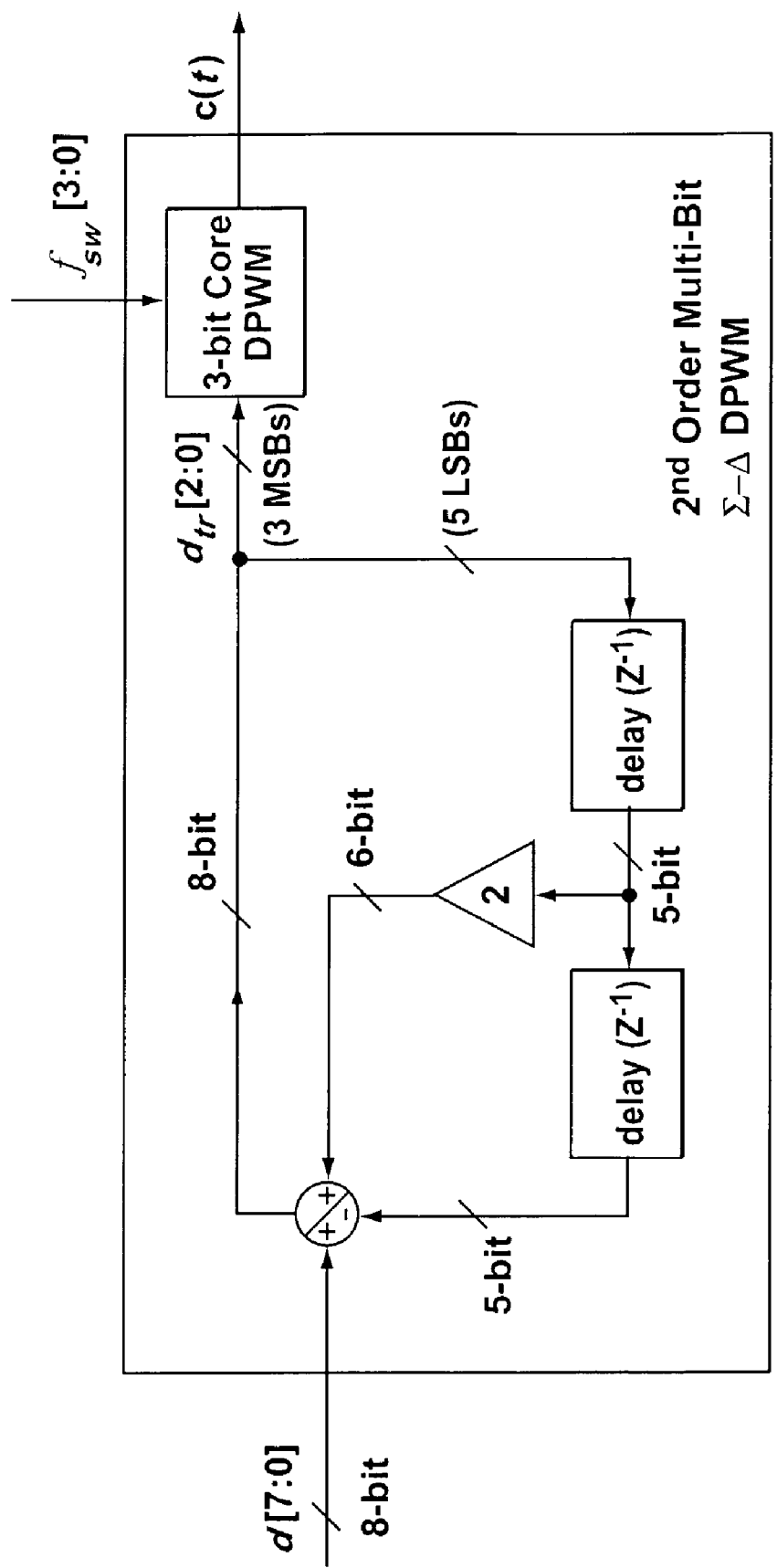
FIG. 2 is a block diagram of the digital pulse-with width modulator (DPWM) of the present invention based on multi-bit second-order sigma delta conversion.
Figure 3:
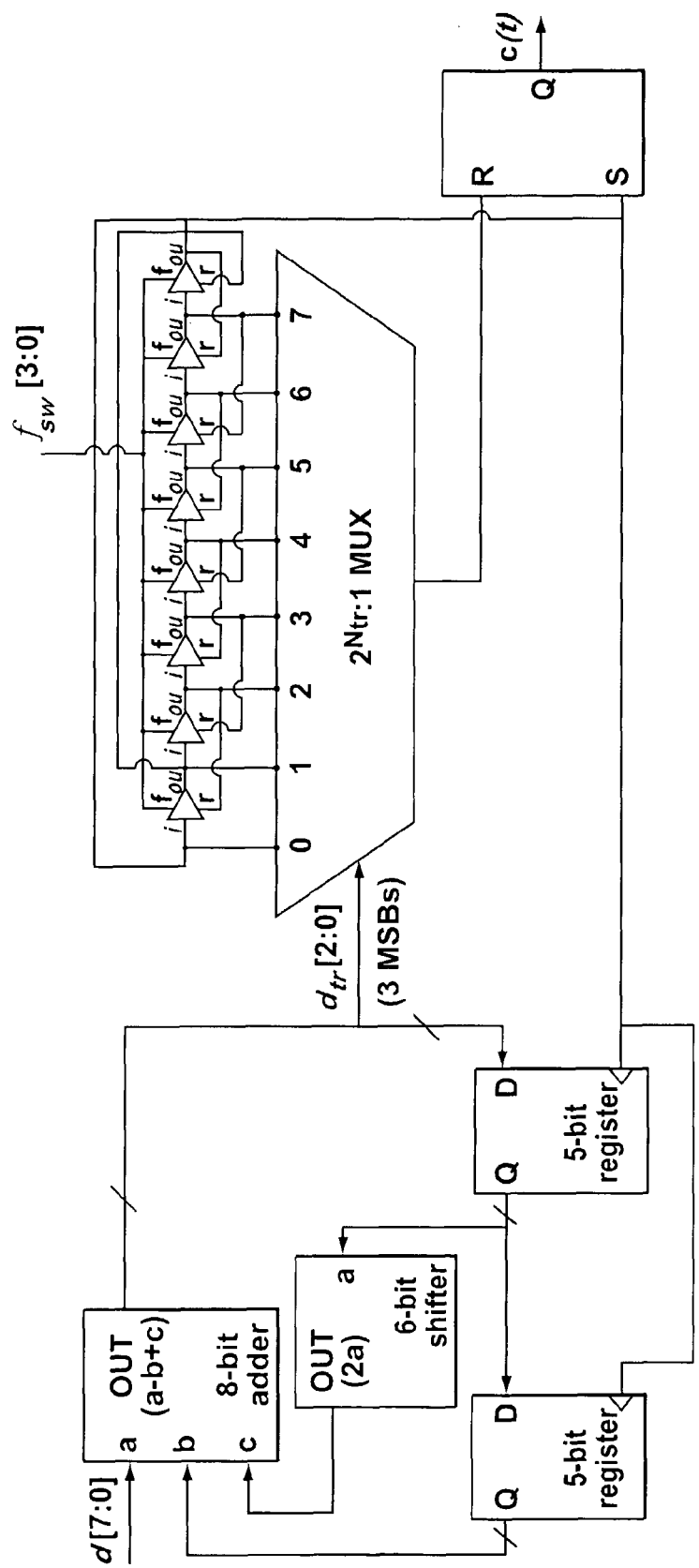
FIG. 3 shows a detailed implementation of the multi-bit second-order sigma delta DPWM.

$2^{nd}$ Order ($\Sigma$-$\Delta$) Multi-Bit Digital Pulse-Width Modulator Architecture The novel DPWM architecture, which we introduce here, is shown in FIGS. 2 and 3. It eliminates need for a power dissipative high-frequency high-resolution DPWM and consequently allows power efficient operation at high switching frequencies. The $2^{nd}$ order $\Sigma$-$\Delta$ DPWM of the present invention, in a particular embodiment of the present invention, includes a high-frequency low-resolution DPWM, which is referred to as core DPWM, a delay line (preferably a set of D-latch-based delay cells shown in FIG. 5 or analog cells shown in FIG. 6), and two adders.

In the specific implementation of the present invention, illustrated in FIGS. 2 and 3, the effective resolution of the $\Sigma$-$\Delta$ DPWM is 8 bits and the low-resolution DPWM is a 3-bit unit. It should be noted that the configuration of FIGS. 2 and 3 is used for illustration purposes. Designs with a larger or smaller number of bits of the input value and different resolution of the core DPWM are also possible and realizable. The system is synchronized with the clock signal at a programmable switching frequency, which is produced by the low-resolution core DPWM.

FIG. 3 shows a low-resolution programmable frequency DPWM implementation in accordance with the present invention that employs a modification of previously known ring-oscillator architecture (for example as described in Reference 3). Again, although the system does not require any external clock, if such a feature is desired, its switching frequency can be synchronized with an external signal, as shown in FIG. 1.

The low-resolution DPWM of the present invention is operable to vary duty ratio of pulse-width modulated signal c(t) between eight possible discrete values (in this example): 0, 0.125, 0.25, 0.375, 0.5, 0.675, 0.75, and 0.875.

The variations are performed over several switching periods to result in an average duty ratio value, which is equal to high resolution digital control command d[n], which in this case is an 8-bit value (see FIGS. 2 and 3). Fast convergence toward the high-resolution value, i.e. short averaging period, is provided with the $2^{nd}$ order $\Sigma$-$\Delta$ loop (as particularized in Reference 12). As explained in Reference 12, each sigma-delta behaves as an internal feedback loop that forces the sequence of low-resolution values at the output to have the same average value as a high resolution input. In this specific realization, the low resolution output is the control signal for the 3-bit core DPWM and the input is d[n] allowing all-digital realization of the $2^{nd}$ order $\Sigma$-$\Delta$ loop, as demonstrated in FIG. 3. The required processing can be performed with simple hardware. Delay blocks are implemented with two sets of D flip-flop registers and the multiplication by 2 is performed through arithmetic shifting avoiding the use of power and area hungry multipliers. Consequently, the complete $\Sigma$-$\Delta$ loop can be implemented with miniature, power efficient hardware.

The averaging is performed by the switching converter itself, i.e. the output LC filter, whose corner frequency $f_c=1/(2\pi\sqrt{LC})$ is significantly lower than $f_{av}=1/T_{av}$, where $T_{av}$ is the averaging period.

Figure 4A:
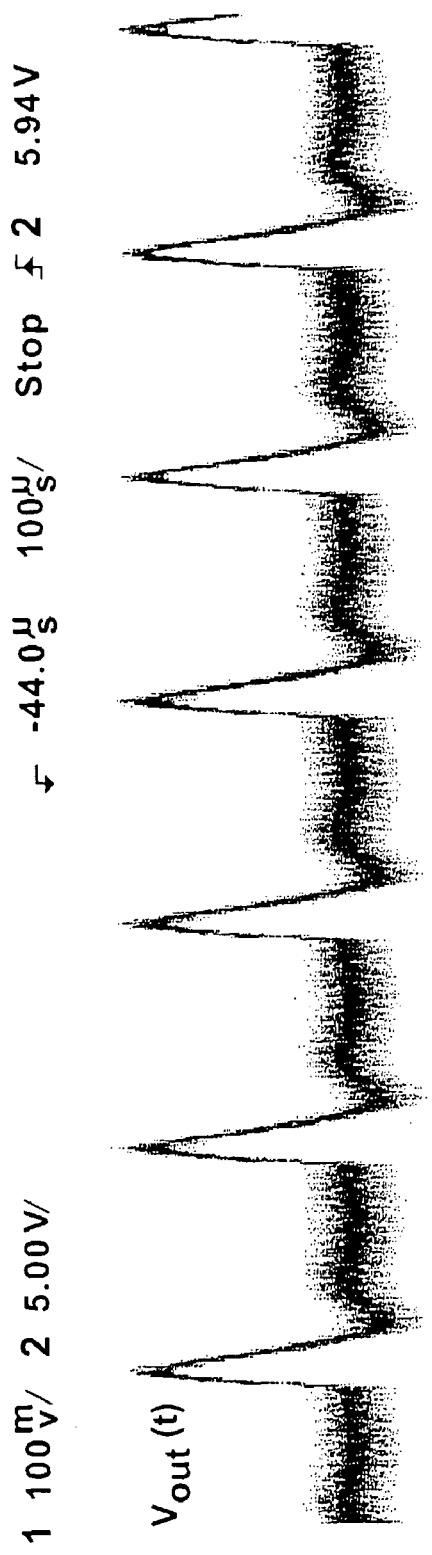
FIG. 4a shows undesirable low-frequency tones in the output voltage of an experimental switching converter, for the case when a first-order multi-bit sigma-delta DPWM is used. Ch1: the ac component of converter output voltage (scale 100 mV/div); Ch2: pulse width modulated signal.
Figure 4B:
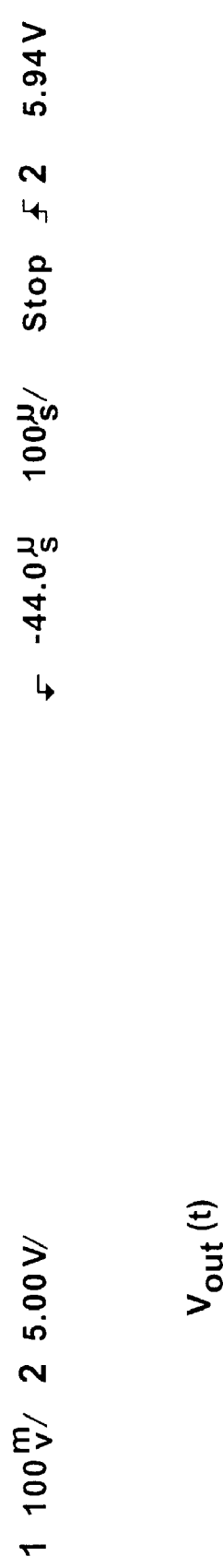
FIG. 4b demonstrates how the second-order multi-bit sigma delta DPWM eliminates the noise problems in the experimental system. Ch1: the ac component of converter output voltage (scale 100 mV/div); Ch2: pulse width modulated signal (c(t) of FIG. 1).

The advantages of the present $2^{nd}$ order $\Sigma$-$\Delta$ DPWM over previously proposed $1^{st}$ order implementations are demonstrated with Table 1 and experimental waveforms of FIGS. 4a and 4b. Table 1 shows sequences of logic states of the multi-bit $\Sigma$-$\Delta$ DPWM shown in FIG. 3 and of a first order multi-bit $\Sigma$-$\Delta$ DPWM, presented in previous art. The states are observed over 24 switching cycles, and the same high resolution, arbitrary selected input d[n] is assumed. It is also assumed that the both modulators utilize a 3-bit low-resolution core DPWM.

| | | 1st Order Sigma-Delta DPWM | | 2nd Order Sigma-Delta DPWM | |
|---|---|---|---|---|---|
| n | d[n] | Duty ratio of c(t) | Average duty ratio value | Duty ratio of c(t) | Average duty Ratio value |
| 1 | 0.265625 | 0.0000 | 0.0000000 | 0.2500 | 0.2500000 |
| 2 | 0.265625 | 0.2500 | 0.1250000 | 0.2500 | 0.2500000 |
| 3 | 0.265625 | 0.2500 | 0.1666667 | 0.2500 | 0.2500000 |
| 4 | 0.265625 | 0.2500 | 0.1875000 | 0.3750 | 0.2812500 |
| 5 | 0.265625 | 0.2500 | 0.2000000 | 0.1250 | 0.2500000 |
| 6 | 0.265625 | 0.2500 | 0.2083333 | 0.3750 | 0.2708333 |
| 7 | 0.265625 | 0.2500 | 0.2142857 | 0.2500 | 0.2678571 |
| 8 | 0.265625 | 0.2500 | 0.2187500 | 0.2500 | 0.2656250 |
| 9 | 0.265625 | 0.3750 | 0.2361111 | 0.2500 | 0.2638889 |
| 10 | 0.265625 | 0.2500 | 0.2375000 | 0.2500 | 0.2625000 |
| 11 | 0.265625 | 0.2500 | 0.2386364 | 0.3750 | 0.2727273 |
| 12 | 0.265625 | 0.2500 | 0.2395833 | 0.1250 | 0.2604167 |
| 13 | 0.265625 | 0.2500 | 0.2403846 | 0.3750 | 0.2692308 |
| 14 | 0.265625 | 0.2500 | 0.2410714 | 0.2500 | 0.2678571 |
| 15 | 0.265625 | 0.2500 | 0.2416667 | 0.2500 | 0.2666667 |
| 16 | 0.265625 | 0.2500 | 0.2421875 | 0.2500 | 0.2656250 |
| 17 | 0.265625 | 0.3750 | 0.2500000 | 0.2500 | 0.2647059 |
| 18 | 0.265625 | 0.2500 | 0.2500000 | 0.2500 | 0.2638889 |
| 19 | 0.265625 | 0.2500 | 0.2500000 | 0.2500 | 0.2631579 |
| 20 | 0.265625 | 0.2500 | 0.2500000 | 0.3750 | 0.2687500 |
| 21 | 0.265625 | 0.2500 | 0.2500000 | 0.1250 | 0.2619048 |
| 22 | 0.265625 | 0.2500 | 0.2500000 | 0.3750 | 0.2670455 |
| 23 | 0.265625 | 0.2500 | 0.2500000 | 0.2500 | 0.2663043 |
| 24 | 0.265625 | 0.2500 | 0.2500000 | 0.2500 | 0.2656250 |

Comparing the sequences for $1^{st}$ and $2^{nd}$ order output signal we can see that that the first order output produces a periodic sequence at a frequency significantly lower than the switching frequency. The periodic sequence, which in this case is characterized with seven successive 0.25 values followed by 0.375, represents a tone, whose frequency, for some inputs, can be lower than the output LC filter corner frequency. As a result undesirable oscillations at the tone frequency are unsuppressed and can occur at the converter output, as shown in the diagram of FIG. 4a, obtained with an experimental utilizing the first order multi-bit $\Sigma$-$\Delta$ DPWM.

In the case of $2^{nd}$ order $\Sigma$-$\Delta$ DPWM, as table above shows, that the tones are pushed to higher frequencies (beyond LC coroner frequency) allowing noise elimination and normal operation of the power supply. The noise suppression effect of general second order $\Sigma$-$\Delta$ modulators is thoroughly described in textbooks (for example in Reference 12) and numerous research papers. The experimental results obtained when the first order $\Sigma$-$\Delta$ DPWM is replaced with the system of FIG. 3 are shown in FIG. 4.b. They confirm noise suppression and positive effect of the $2^{nd}$ order $\Sigma$-$\Delta$ DPWM. The table above also shows that present $2^{nd}$ order structure has much faster conversion toward the high-resolution input value (the average duty ratio reaches the high resolution input after 8 cycles only) thereby allowing faster dynamic response.

Programmable Ring-Oscillator Based DPWM

FIG. 3 shows a 3-bit core DPWM with programmable frequency based on a ring oscillator. It consists of an 8-to-1 multiplexer ($2^{Ntr}$-to-1 in general, where $N_{tr}$ is the resolution of core DPWM), a delay line comprising eight delay cells with programmable delay times (in general $2^{Nt}$ cells), and an S-R latch. At the beginning of each switching cycle output SR latch is set, and the pulse propagates through the oscillator, from the cell connected to the zero input to the left, and the output signal c(t) goes high. When the pulse propagating through the oscillator reaches the input selected by the input word $d_{tr}[n]$, the output SR is reset and the output goes low. In this way pulse-width modulated signal is formed. The frequency of c(t), i.e. the switching frequency, is determined by the total delay of all 8 cells of the ring oscillator. In the present embodiment of the DPWM, the frequency can be changed using either analog or digital delay cells shown hereafter.

Programmable Digital Delay Cell

Figure 5:
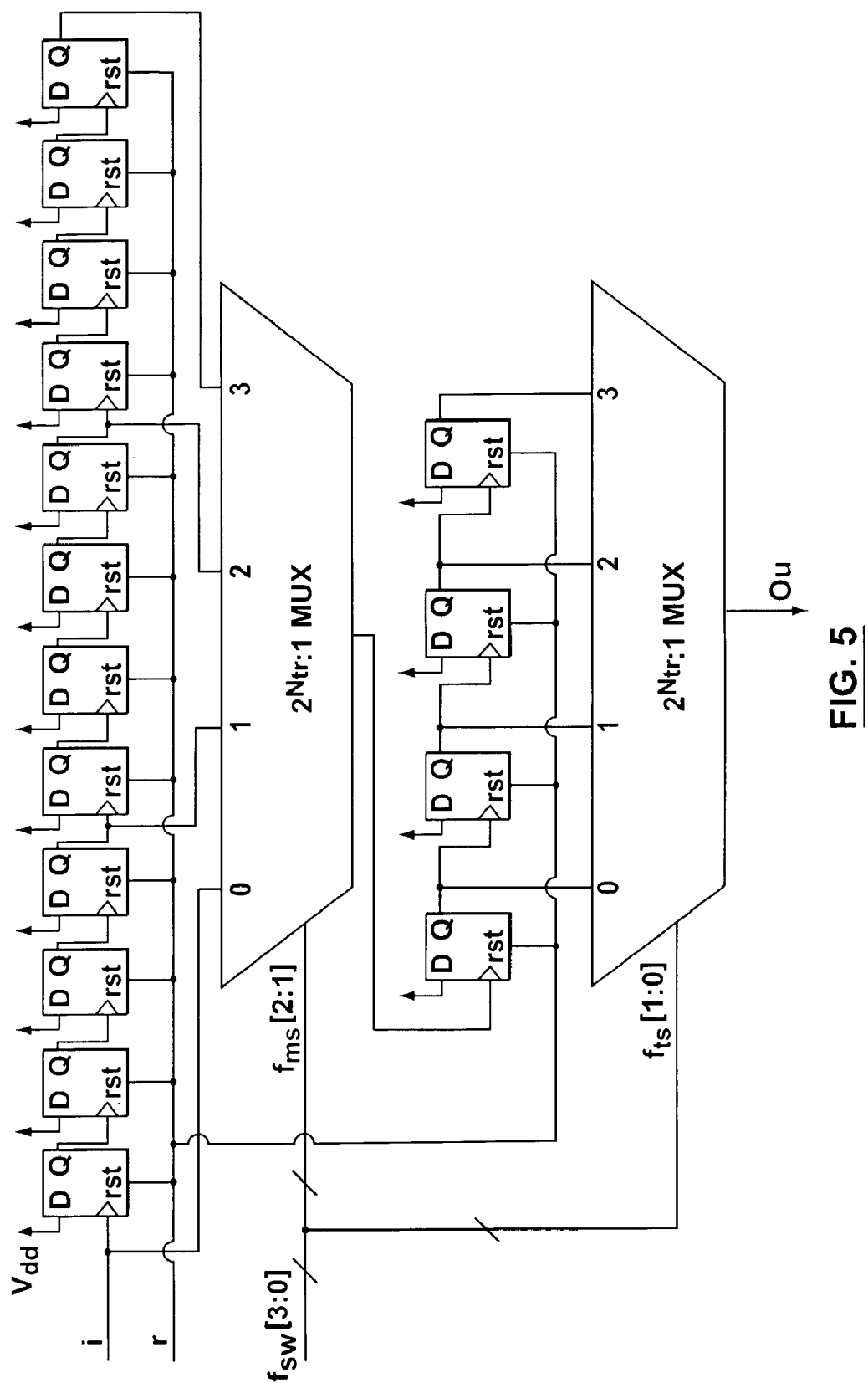
FIG. 5 demonstrates a digital implementation of a programmable delay cell of the present DPWM.

The representative programmable digital delay cell of FIG. 5 produces sixteen discrete time delays, which value depends on the 4-bit frequency control value f[3:0]. It comprises sixteen positive edge triggered D flip-flops and two 4-to-1 multiplexers. As shown in FIG. 5, twelve D flip-flops are connected to one multiplexer, four between each two multiplexer inputs (i.e. taps), and the remaining four D flip-flops are connected to the other multiplexer, one in between each two taps. The propagation time of a signal from the input of the delay cell i to its output Ou (time delay of the cell) depends on the number on the internal delays and number of D flip-flops signal propagates through before it reaches the multiplexers' taps selected by f[3:0]. The signal starts propagating through set of larger delay blocks formed of 4 flip-flops. Then, when it reaches first multiplexer tap, selected by two most significant bits of control word f[3:2], it moves through the multiplexer and continues propagating through the next set of single D flip-flop delay blocks. Finally, when it reaches the tap of the second multiplexer selected by f[1:0] it moves to the output.

It should be noted that an alternative implementation using just one 16-to-1 bit multiplexer and a single D flip-flop in between each two taps is also possible. However, the realization of a 16-to-1 multiplexer would require five 4-to-1 multiplexers resulting in much larger on-chip area than the proposed solution.

Programmable Analog Delay Cell

Figure 6:
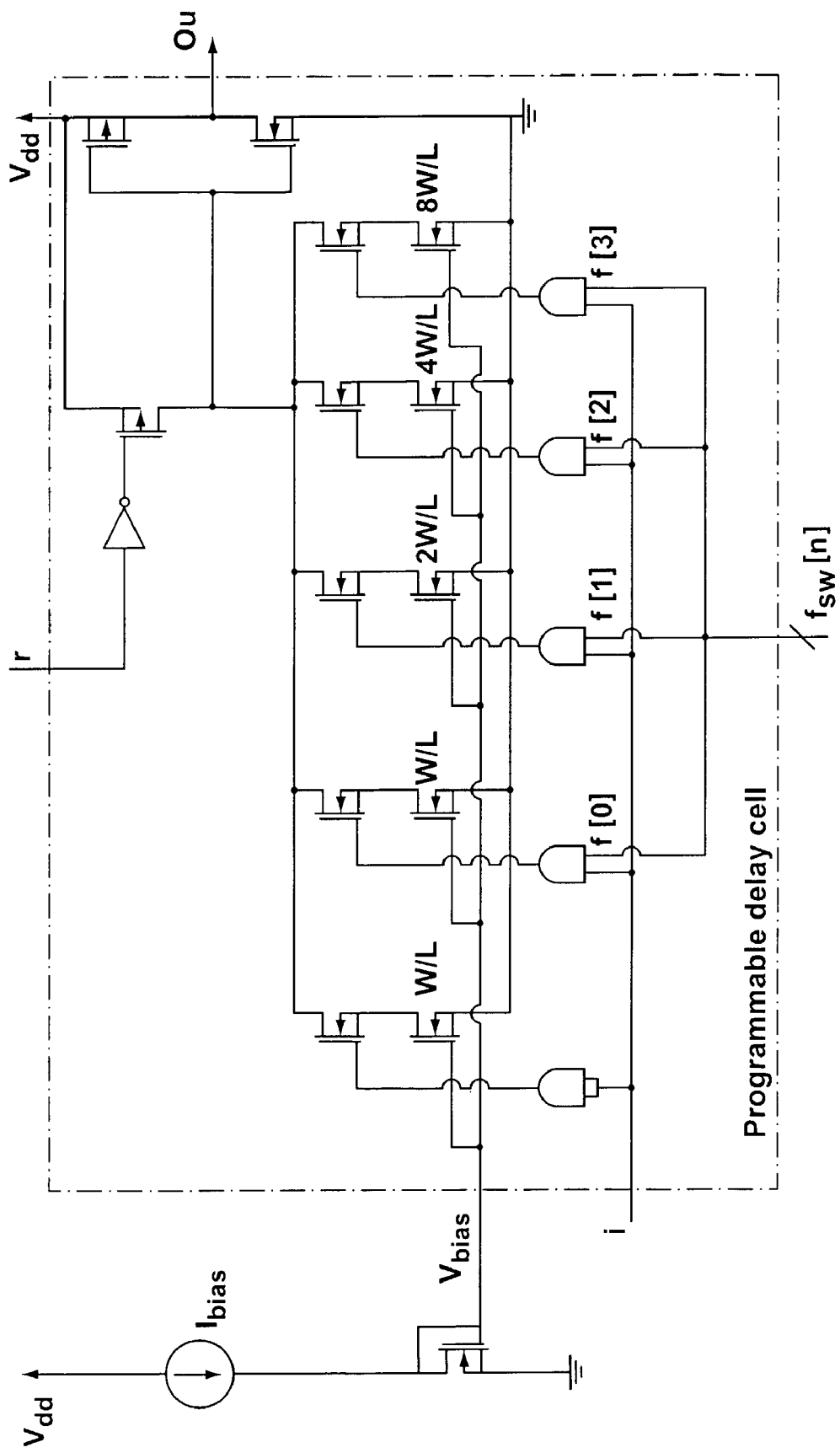
FIG. 6 depicts an analog implementation of a programmable delay cell of the present DPWM.
Figure 7:
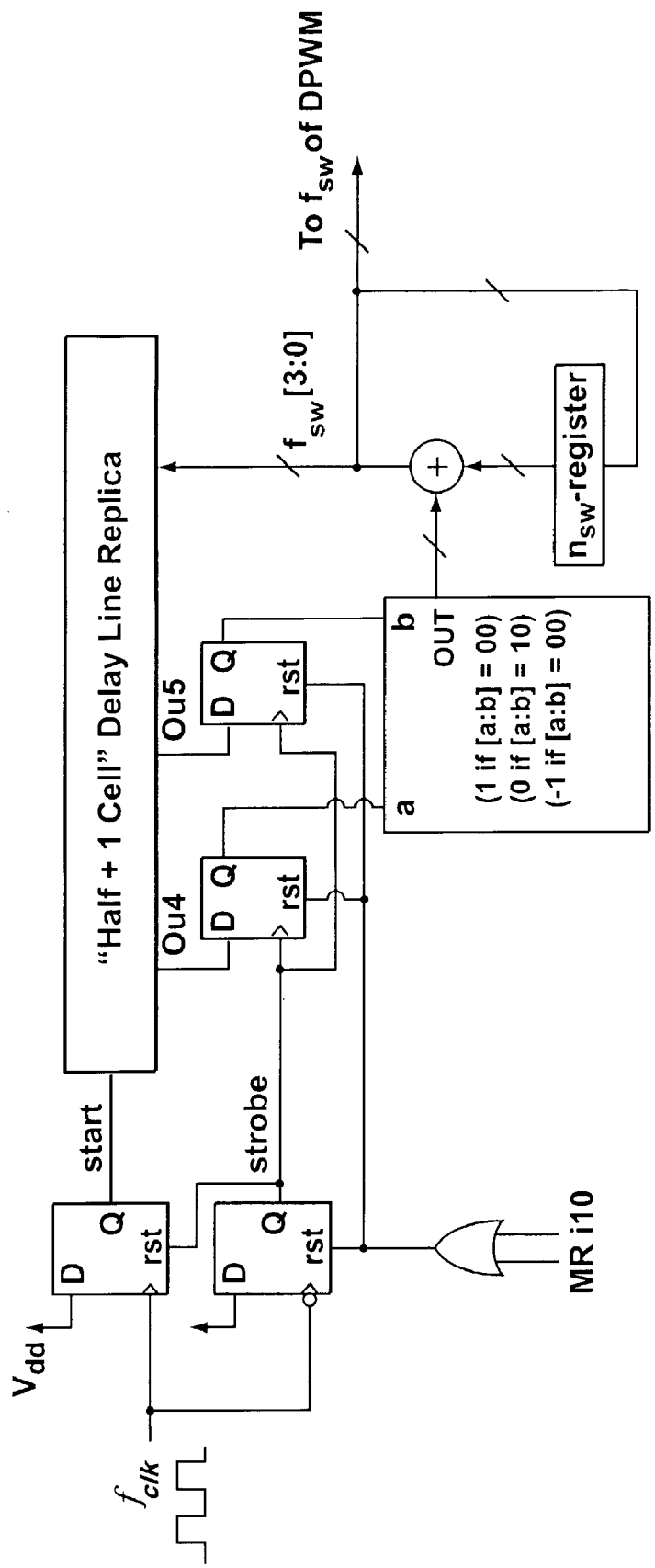
FIG. 7 shows a frequency regulation block that allows frequency synchronization of with an external clock signal.

FIG. 6 shows an analog equivalent of a programmable digital delay cell that, in on-chip implementation could be used to further reduce the size and power consumption of the cell. The cell comprises a modified current starved delay cell. In this case, NMOS current mirroring transistor, which creates delay by discharging equivalent capacitance seen at the node a, is replaced with a set of ten transistors. Five of them acting as logic switchers and another five are current mirror transistors biased with the same external circuit as shown in FIG. 6. In this implementation, single biasing circuit is shared among all eight delay cells. The current mirror transistors are sized differently (W/L, W/L, 2W/L, 4W/L, and 8W/L) resulting in different mirroring of bias current through them and consequently in different transition (delay) times. The programmable delay time is achieved through frequency control input f [3:0] and switching transistors, by changing the number of current mirrored transistors operating in parallel during transition period, where the larger number of transistors corresponds to faster transition time.

Frequency Synchronization Block

In some applications, it is desirable to have the switching frequency of the SMPS synchronized with an external clock. FIG. 6 shows a novel frequency synchronization block that allows this feature. The synchronization is achieved by comparing a half of the external signal period with the delay time of one half of the delay cells of the core DPWM.

The system consists of a "Half+1 Cell" replica of the delay line, four edge-triggered D flip-flops, a combinatorial logic and a 4-bit register (accumulator). For the case when a 3-bit ring based core DPWM is used, the "Half+1 Cells" replica of the delay line has only five delay cells, identical to the eight cells of the DPWM. At a rising edge of an external clock, the start signal is created and passed through the delay line replica, whose 4$^{th}$ and 5$^{th}$ cell (N/2 and N/2+1) are connected to two edge triggered flip-flops. Then, at the immediately following negative edge, a strobe signal is created and a "snapshot" of the states of the two replica's delay cells is taken and processed with a simple digital logic. Two zeroes at the outputs of the snapshot flip-flops indicate slower propagation (i.e. longer switching period) and produce 1 at the output of the digital logic. As a result, the value of frequency control register f$_{sw}$[3:0] increases and the switching frequency increases accordingly. Two ones at the input of the digital logic indicate operation at a faster switching frequency, result in negative output, and cause a decrease of f$_{sw}$. It is assumed that half periods of the DPWM and the external clock are equal when the input is 10 and the frequency register remains unchanged.

It should be noted that an ideal external clock with precise 50% duty ratio is assumed. For the case when a non-ideal clock signal is applied, the present circuit needs minor modification. In that case, the delay line needs to be replaced with a "full-length+1" replica and the start and the strobe signal need to be created with two successive edges of the clock signal.

Dual Sampling/Clocking Mode Controller

Figure 8:
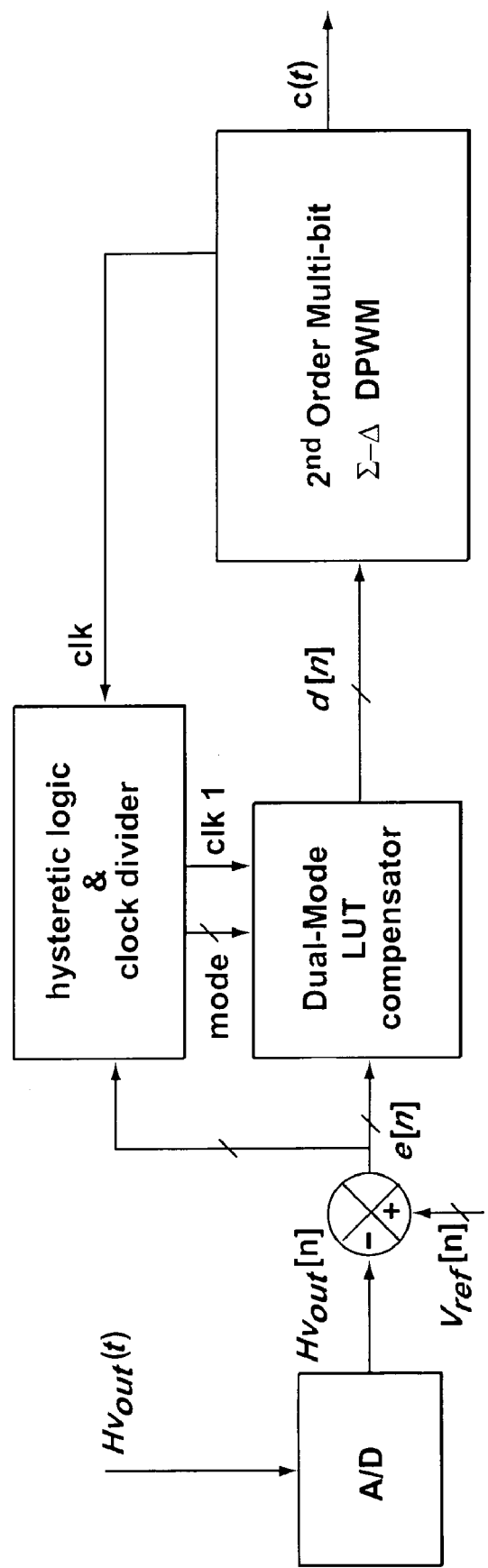
FIG. 8 is a block diagram illustrating the dual sampling/clocking mode of the digital controller of the present invention.

This section shows a controller suitable for the use with the previously described DPWM as well as with other low-power high-frequency configurations. A block diagram of the controller is given in FIG. 8. It utilizes a dual-sampling/clocking scheme, which results in a low power consumption and in fast response to transients in the system.

The controller operates as follows. The attenuated output voltage of the switching converter Hv$_{out}$(t) (see FIG. 1) is converted into its digital equivalent Hv$_{out}$[n] using a windowed A/D and then compared to the reference value V$_{ref}$[n]. The windowed A/D produces one of only seven possible discrete values of the errors signal e[n] (from −3 to +3), based on which the mode of the controller operation is set. The error is monitored with the hysteretic logic & clock divider block.

When the error is small, in the range of −3 to +3, the system operates in steady-state mode with the clock (clk 1 of FIG. 5) lower than the switching frequency. In this mode a high resolution control value d$_{s-s}$[n] is updated every sixth cycle allowing Σ-Δ DPWM to perform averaging. In this specific implementation, averaging is performed over eight switching periods, resulting in a high effective resolution of the pulse-width modulated signal. In addition, since the switching action of the controller is less frequent, and the undersampling minimizes power consumption. Moreover, the undersampling also minimizes the influence of all processing delays in the digital control loop, including A/D conversion time, processing time of the digital compensator and effective delay of the DPWM, resulting in improved system stability. This is because the phase shift that is proportional to the ratio of the delay and the sampling period is minimized when the sampling/updating period is increased.

To improve dynamic characteristics of the system, which are limited by the steady-state mode, a dynamic mode is introduced. The controller enters into the dynamic mode when the hysteretic logic recognizes an absolute error larger than 3. At that moment it changes clock rate of the system, the control law of dual-mode look-up table (LUT) based compensator, and effectively eliminates the influence of the internal feedback of the Σ-Δ DPWM. In this mode, the fast DPWM inside the Σ-Δ DPWM is directly fed by most significant bits of the control input that corresponds to the low-resolution core DPWM input value d$_{lr}$[n] (See FIGS. 2 and 3), which is updated every switching cycle. The controller stays in the dynamic mode until the absolute value of the error drops bellow 1, and then it switches back to the steady-state mode. In steady-state again high resolution of the pulse width modulated signal that is necessary for operation without limit-cycle is ensured. When in the transient state, the controller operates much faster and burns more power, when in the steady state it runs slower and more efficiently. The idea is based that 99% of the time we operate in steady state mode and there is no need to burn the power all the time. Conventional solutions use a compromise, and create controllers that are not very slow but take much larger power than our controller.

Dual-Mode Look-Up Table Based Compensator

The dual mode look-up table compensator shown in FIG. 9 combines flexibility of a conventional multiplier based implementation with low-power consumption of a conventional look-up table compensator shown in the previous art (Reference 3 below).

In conventional DSP and microprocessor based compensator implementations, digital multipliers are used to compute control value d[n]. Usually, the computation is performed using current value of error signal e[n], previous error values e[n−1], e[n−2], . . . , e[n−k], and previous control output values d[n−1], d[n−2], . . . d[n−m]. A general algorithm for calculation of the new value can be described with the following equation $$d[n]=\alpha_1 d[n-1]+\alpha_2 d[n-2]+\ldots+\alpha_m d[n-m]+\beta_1 e[n]+\beta_2 e[n-1]+\ldots+\beta_k e[n-k]$$

where, $\alpha_i$ and $\beta_j$ are compensator coefficients that shape dynamic performance of the system. The calculation of this type generally requires the use of multipliers, which generally take a large on-chip area and have high power consumption. In low power devices, the amount of power taken by the multipliers is usually intolerably high even when algorithms with minimal number of multiplications are performed, making them unsuitable for the applications of interest.

As an alternative, a solution based on look-up tables (LUTs) has been proposed in the previous art (as described in Reference 3). In the proposed solution a small number of pre-calculated values described with the following equation $$d[n]=d[n-1]+ae[n]+be[n-1]+ce[n-2]$$

is kept in look up tables eliminating need for the power hungry multipliers. As a result the power consumption of the controller is significantly reduced and the realization on relatively small chip area is allowed.

However, the proposed solution suffers from a lack of flexibility and as such is not suitable for the present control method.

Figure 9:
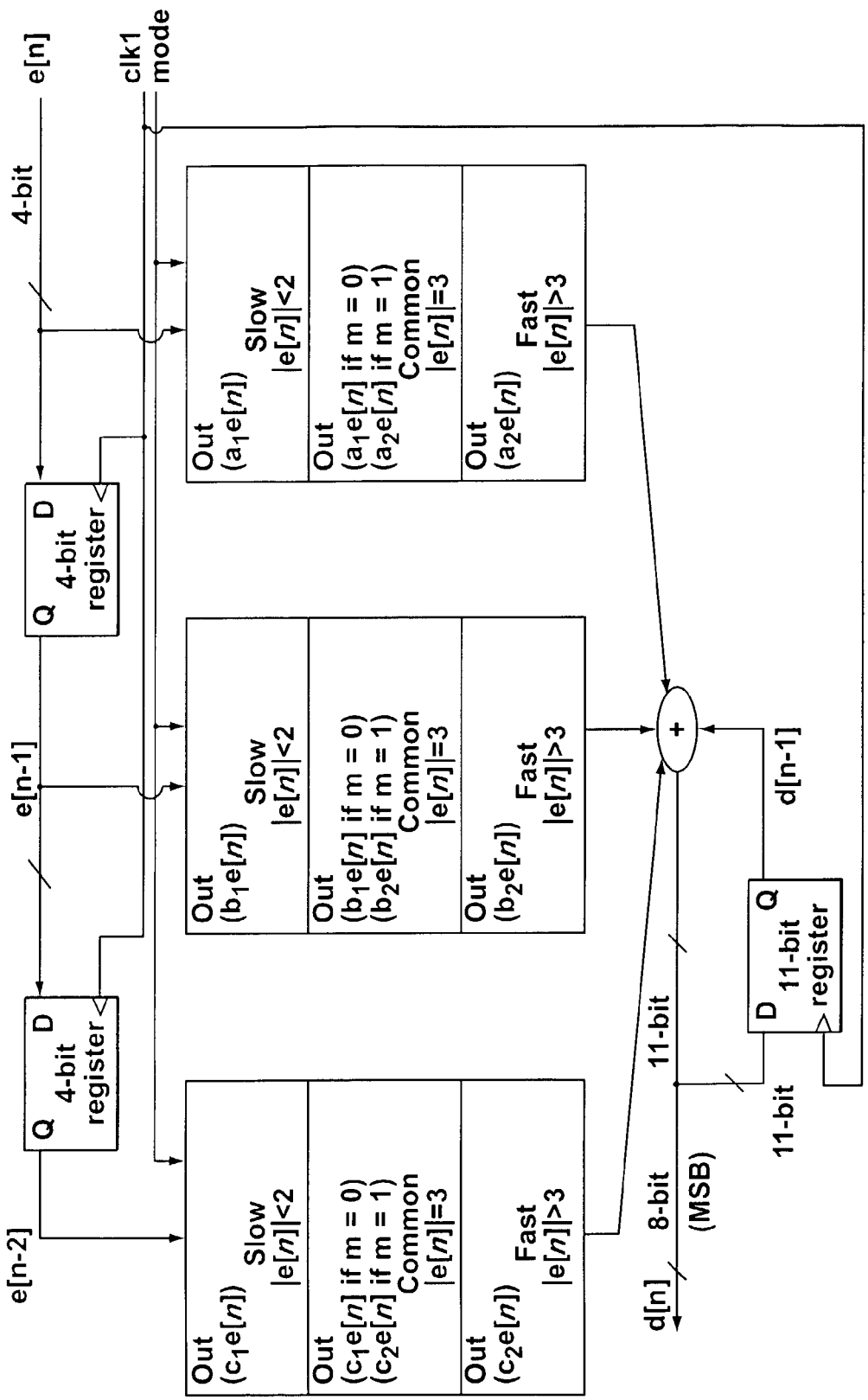
FIG. 9 shows a flexible dual-mode look-up table based digital compensator.

The novel solution of FIG. 9 shows a dual mode look up table with multiple entries for illustration of specific control values. The table can be separated in three main parts named slow, common, and fast. The entries that correspond to the small values of the error signal and operation in steady-state mode are stored in the slow portion and the values for operation in the dynamic mode are kept in the fast portion of the table. The common part has two sets of registers and the outputs of the table depend on the mode of operation, selected by mode control bit. This implementation allows flexibility of the regulator with a minimal increase in the system size and complexity. It should be noted that efficient the implementation of this system with two sets of completely independent look up tables could be possible. However, this implementation would be significantly less efficient in terms of the system power consumption and the on-chip area occupied by the compensator.

Verification

The operation of the present invention is verified with two realizations utilizing different implementation technologies. First, an all-digital prototype using a low-price FPGA development board was built. Then, an application specific integrated circuit (ASIC) was built. The ASIC utilizes analog delay cells shown in FIG. 6.

Using the FPGA system, a DPWM based on the block-diagrams of FIGS. 2 and 3 was constructed and pulse width modulated waveforms are measured.

Figure 10:
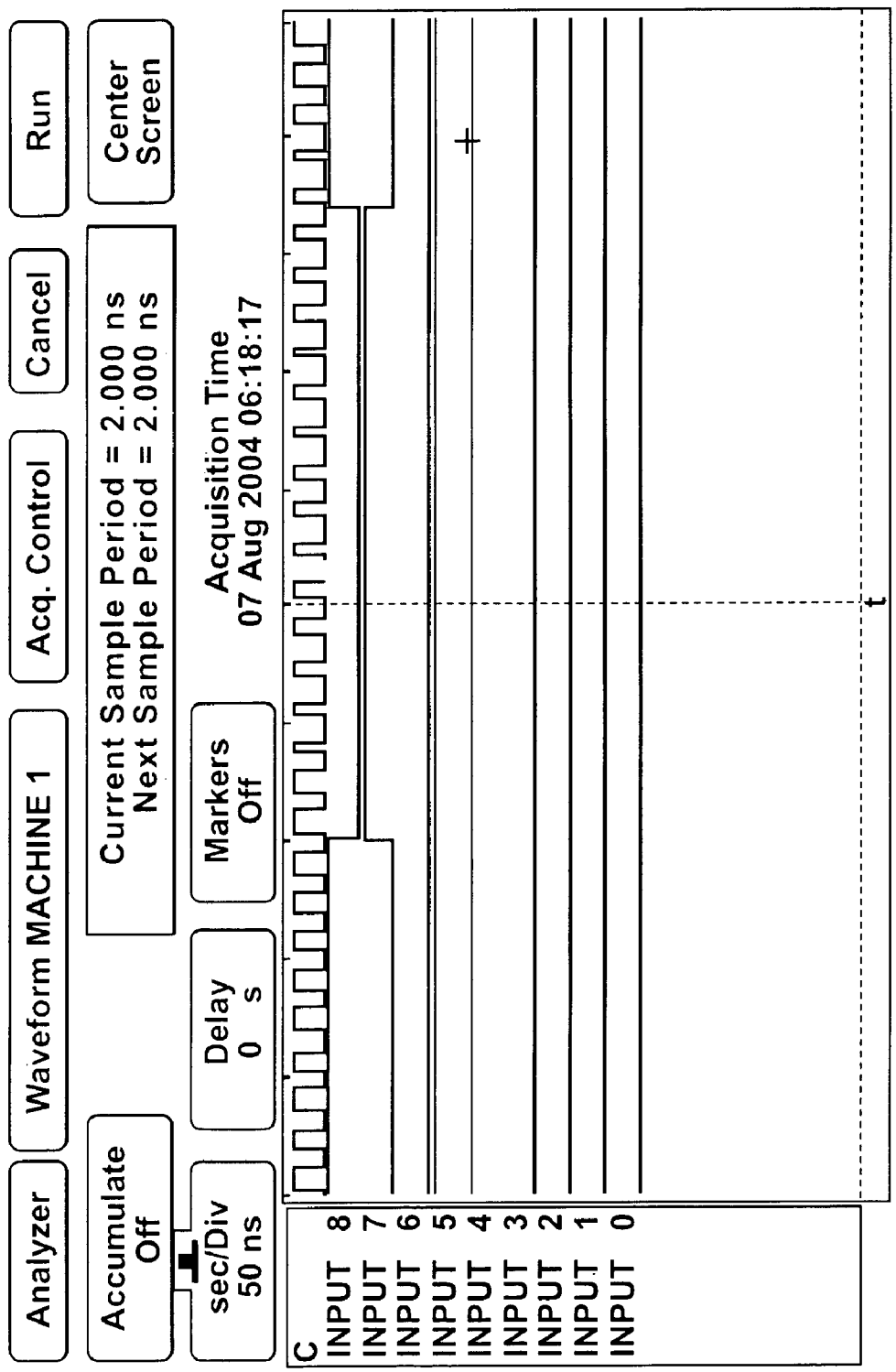
FIG. 10 illustrates an experimental pulse-width modulated waveforms at 60 MHz produced by Σ-Δ digital pulse width modulator.

FIG. 10 shows pulse-width modulated waveforms captured with a logic analyzer, when the control command d[n] (see FIG. 2) was changing between two 8-bit values. It can be seen that this FPGA implementation of the new DPWM allows operation at a constant frequency up to 60 MHz, which is in order of magnitude faster than any other known constant frequency all-digital solution. In this case, the delay cells of the low-resolution DPWM were constructed of FPGA' D-flip-flops, for which the typical propagation delay is 2.5 ns.

Experimental Verification (All-Digital FPGA Implementation)

Figure 11:
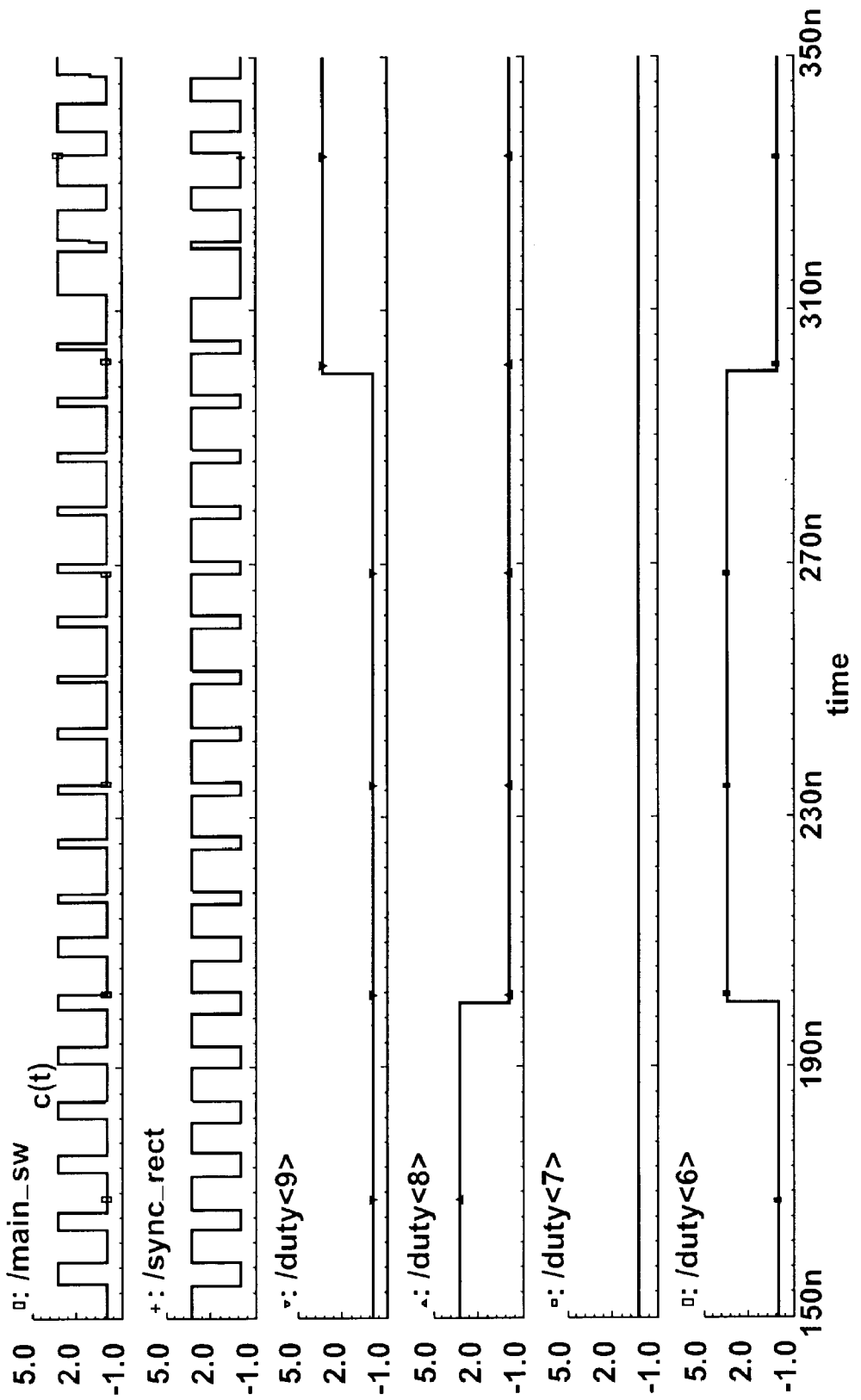
FIG. 11 shows the simulation results: pulse-width modulated waveforms at 115 MHz produced by the Σ-Δ DPWM IC. C and c̄ are the outputs of the dead-time circuit (FIG. 4); Duty 6 to 9 are 4 most significant bits of the 10-bit input control value d[n].

The results of the verification demonstrated that the architecture of the present invention results in a significant increase of the switching frequencies at which digital controllers can be used. It is reasonable to assume that by transferring this design on an integrated circuit that is faster than the FPGA structure used, pulse width modulated signals at even higher frequencies (in the range of 100 MHz and about 120 MHz with optimization) could be achieved. This is based on implementation of the architecture to an integrated circuit in a manner that is known to those skilled in the art. Simulation results of such on-chip implementation are shown in FIG. 11, they verify operation at frequency of 115 MHz.

Closed Loop Operation

To further verify the operation of the controller, an experimental system based on block diagrams shown in FIG. 1 was constructed. To limit the switching losses of the buck converter switching frequency was decreased to 2 MHz using programmable delay cells shown in FIG. 5.

Figure 12:
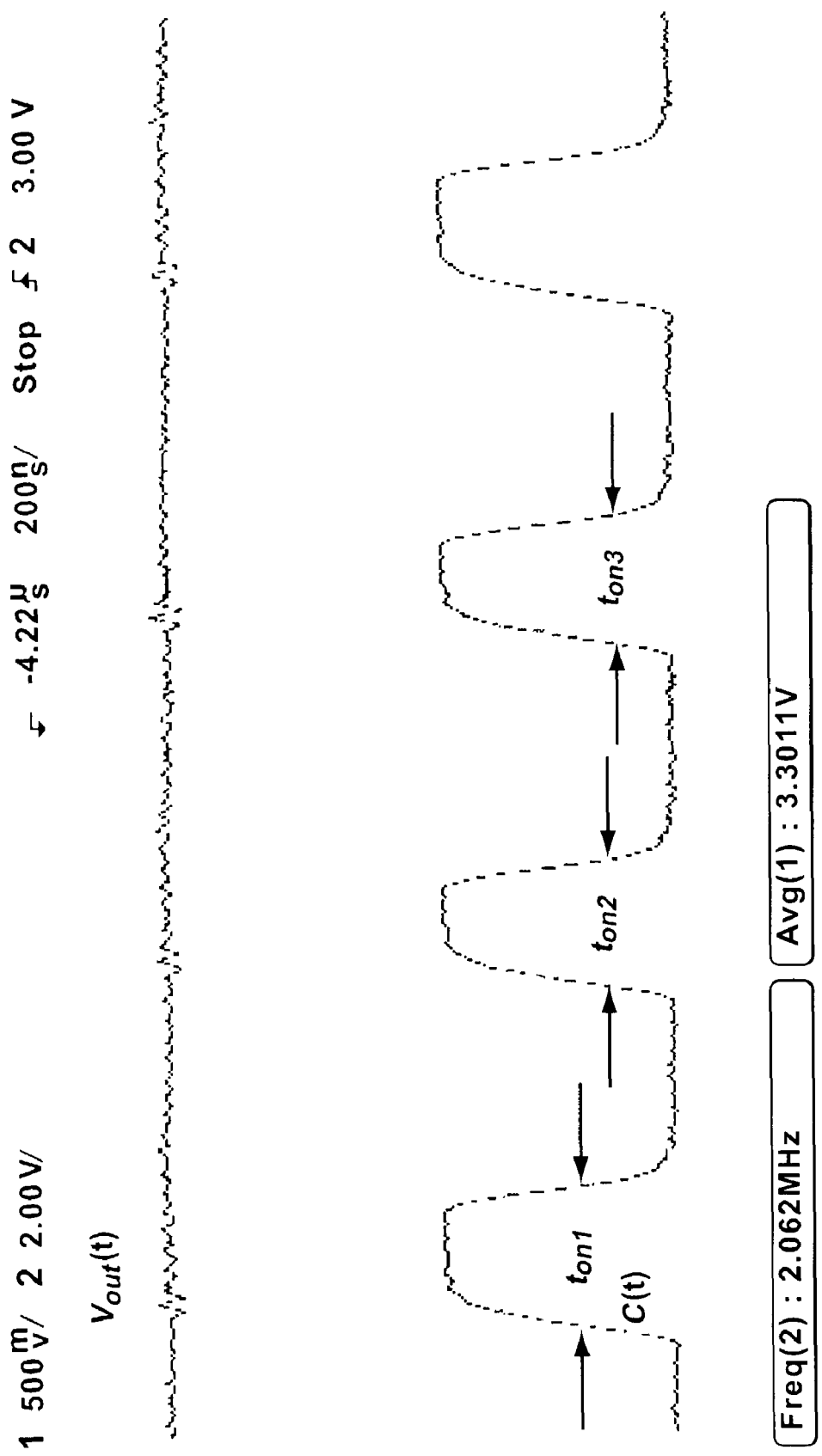
FIG. 12 illustrates the steady state operation of the digital controller of the present invention at 2.06 MHz switching frequency for $V_{in}$=8 V. Ch.1: Output voltage $v_{out}$(t) (500 mV/div), Ch.2: Pulse width modulated control signal c(t) and time scale is 200 ns/div.

The buck converter is designed to operate with input voltage that varies from 4 to 10 V, at regulated output of 3.3 V, and to supply up to 1 A of the current at its output. The results of closed loop operation in steady-state mode are shown in FIG. 12. It can be seen how the $\Sigma$-$\Delta$ DPWM controller varies the duty ratio (i.e. $t_{on}$ times) over successive switching periods to maintain well-regulated output voltage.

Figure 13:
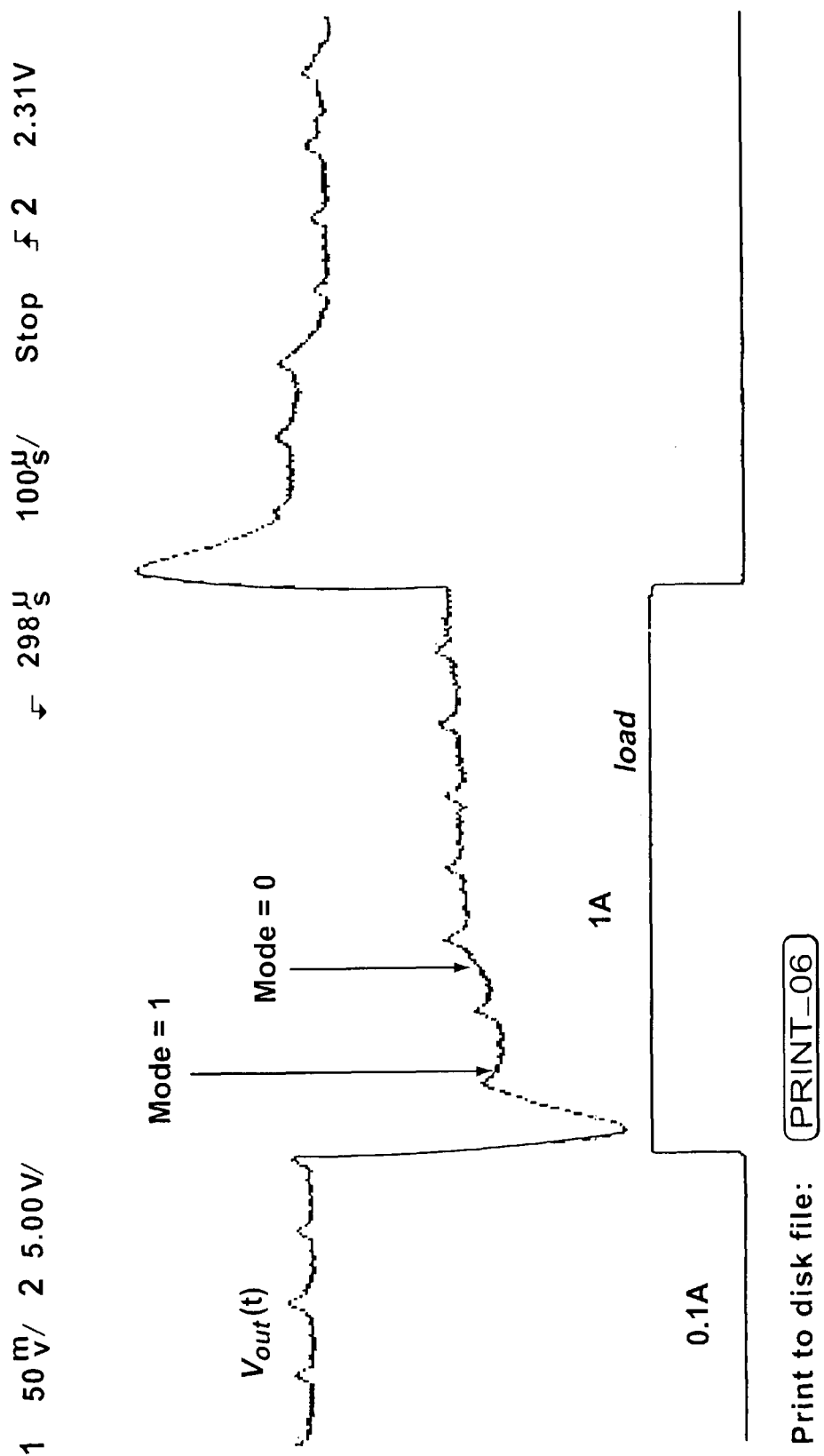
FIG. 13 illustrates the steady state operation of the digital controller of the present invention at 12 MHz switching frequency, $V_{in}$=3.3 V. Ch.1: Pulse-width modulated control signal c(t) and time scale is 100 ns/div Ch.1: Output voltage $v_{out}$(t) (200 mV/div).

FIG. 13 shows experimental results with a smaller 300 mW switching converter operating at ultra high switching frequency of 12 MHz. In this case regulated output voltage is set to 1.2 V and input voltage is 3.3V. These results are obtained with an application specific integrated circuit utilizing the new method and analog programmable delay cells.

Figure 14:
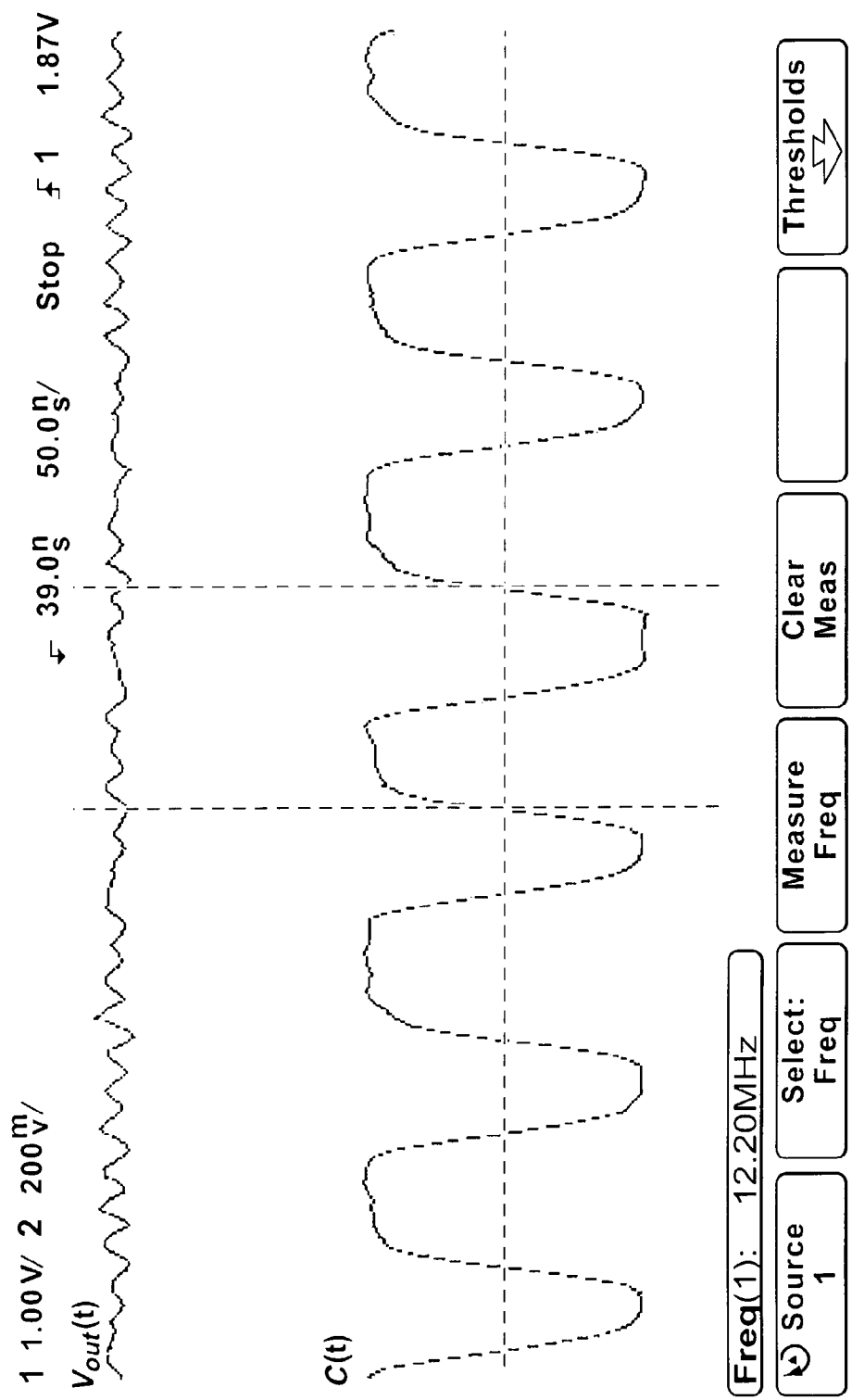
FIG. 14 illustrates transient response for the load change between 0.1 and 1 A, Ch.1: Output voltage $v_{out}$(t) (50 mV/div-ac scale), Ch. 2: load transient, and Time scale is 100 μs/div.

Results of the measurement of the load transient response for the output load changes between 0.1 A and 1 A are shown in FIG. 14. Upon the transient the dynamic mode was activated with the high value of the control signal mode (see FIG. 8) and the controller quickly reduced overshoot caused by the load change. In the second phase, when the output voltage approached desired regulated value, the mode signal returned to zero value, and controller returned to steady-state mode characterized with improved voltage regulation. It can be seen that dual sampling technique results both in good output voltage regulation and fast dynamic response.

This document describes a digital controller for low-power DC-DC converters operating at ultra high constant switching frequencies. A novel architecture for a digital pulse-width modulator (DPWM) based on multi-bit $2^{nd}$ order sigma-delta conversion ($2^{nd}$ order $\Sigma$-$\Delta$ DPWM) is introduced. The $2^{nd}$ order $\Sigma$-$\Delta$ DPWM architecture is especially suitable for on-chip implementation. It allows creation of high-resolution high-frequency pulse-width modulated signals, and can be implemented with miniature low-power hardware. The invention also presents a new dual sampling/clocking mode control scheme that allows further reduction in power consumption of digital controller without penalties in the controller dynamic performance. Experimental FPGA-based implementation verifies advantages of the new architecture. Pulse width modulated signals at frequency of 60 MHz are produced and closed loop operation of DC-DC converter operating at 2 MHz is demonstrated.

REFERENCES

[1] J. Xiao, A. Peterchev, J. Zhang, S. R. Sanders, "An Ultra-Low-Power Digitally-Controlled Buck Converter IC for Cellular Phone Applications," in *Proc. IEEE APEC'04 Conf.*, 2004, pp. 383-391.

[2] A. V. Peterchev, J. Xiao, and S. R. Sanders, "Architecture and IC Implementation of a Digital VRM Controller," *IEEE Transactions on Power Electronics*, Special Issue on Digital Control, vol. 18, pp. 356-364, January 2003.

[3] B. Patella, A. Prodić, A. Zirger, D. Maksimović, "High-Frequency digital controller PWM controller IC for DC-DC converters," *IEEE Transactions on Power Electronics*, Special Issue on Digital Control, vol. 18, pp. 438-446, January 2003.

[4] A. P. Dancy, R. Amirtharajah, and A. P. Chandrakasan, "High-Efficiency Multiple-Output DC-DC Conversion For Low-Voltage Systems," *IEEE Transactions on VLSI Systems*, vol. 8, pp. 252-263, June 2000.

[5] Data Sheet, TPS 62300, 500-mA, 3-MHz Step-Down Converter, Texas Instruments Inc.

[6] Data Sheet, MAX 85600, 4 MHz, 500 mA, Step-Down Dc-Dc Converter, Maxim.

[7] A. V. Peterchev, S. R. Sanders, "Quantization Resolution and Limit Cycling in Digitally Controlled PWM Converters," *IEEE Transactions on Power Electronics*, Special Issue on Digital Control, vol. 18, pp. 301-308, January 2003.

[8] H. Peng, A. Prodić, E. Alarcón, and D. Maksimović, "Modeling of Quantization Effects in Digitally Controlled DC-DC Converters," in *Proc. IEEE PESC Conf.*, 2004, June 2004, pp. 4312-4318.

[9] A. Syed, E. Ahmed, D. Maksimović, and E. Alarcon, "Digital Pulse Width Modulator Architectures," in *Proc. IEEE PESC'04 Conf.*, 2004, pp. 4689-4695.

[10] Smith, K. M.; Smedley, K. M.; Yunhong Ma; "Realization of a digital PWM power amplifier using noise and ripple shaping" IEEE PESC '95 Page(s): 96-102.

[11] Z. Lu, Z. Qian, Y. Zang, W. Yao, G. Chan, Y. Wang, "Reduction of digital PWM limit ring with novel control algorithm," IEEE APEC 2001, pp. 521-525.

[12] D. A. Johns and K. Martin, *Analog Integrated Circuit Design*, Wiley & Sons 1997, pp. 537-559.

The invention claimed is:

1. A digital controller for use in DC-DC switching converters comprising:
   a multi-bit digital pulse-width modulator;
   a dual sampling/clocking mode controller linked to said digital pulse-width modulator;
   said digital pulse-width modulator and said dual sampling/clocking mode controller in combination being operable to control a low-power DC-DC switch-mode power supply operating at high constant switching frequency; and
said digital controller being operable at low power consumption.

2. The digital controller of claim 1, said digital controller producing an output voltage that is capable of being at least one of undersampled at a frequency lower than a switching frequency and sampled at a switching rate.

3. The digital controller of claim 1, said digital controller producing an output voltage, said digital controller being capable of sampling the output voltage at a switching rate to provide fast transient response, said digital controller being further capable of undersampling the output voltage at a frequency lower than a switching frequency to reduce power consumption.

4. The digital controller of claim 1, said digital controller being configured to assume a steady state mode and a dynamic mode and producing an output voltage that is capable of being sampled, said output voltage being sampled at a frequency lower than a switching frequency when said digital controller assumes the steady state mode, said output voltage being sampled at a switching rate when said digital controller assumes the dynamic mode.

5. The digital controller of claim 1, said digital pulse-width modulator being operable to vary a duty ratio of a pulse width modulated signal between a plurality of possible discrete values that over a plurality of switching periods and based on an output from the plurality of switching periods, an average duty ratio value is established, the average duty ratio value being equal to a high resolution digital control command.

6. The digital controller of claim 1, said digital pulse-width modulator using second-order multi-bit sigma-delta digital pulse-width modulation.

7. The digital controller of claim 1 further comprising:
said digital pulse-width modulator using second-order multi-bit sigma-delta digital pulse-width modulation; and
said digital controller including a dual-mode compensator for reducing power consumption and improving effective resolution in a steady state of the digital pulse-width modulator to improve response during a plurality of transient states.

8. The digital controller of claim 1 further comprising:
said digital pulse-width modulator using second-order multi-bit sigma-delta digital pulse-width modulation and including a delay line; and
said delay line including a digital programmable cell to enable frequency switching at different power stages.

9. The digital controller of claim 1 further comprising:
said digital pulse-width modulator using second-order multi-bit sigma-delta digital pulse-width modulation and including a delay line;
said delay line including a digital programmable cell to enable frequency switching at different power stages; and
an analog programmable delay cell and a ½ line plus 1 frequency regulator to allow synchronization with an external clock.

10. The digital controller of claim 1 wherein high frequency of operation occurs between about 1 and 5 MHz.

11. The digital controller of claim 1 wherein ultra-fast switching frequency occurs above about 10 MHz.

12. The digital controller of claim 1 wherein high resolution occurs that is resolution providing tight output voltage regulation without limit cycle oscillations.

13. The digital controller of claim 1 wherein low resolution occurs that is resolution of conventional counter based solutions at high frequencies, between about 1 and 5 MHz, having a resolution of less than 6 bits.

14. A digital controller for use in DC-DC switching converters comprising:
a multi-bit digital pulse-width modulator;
a dual sampling/clocking mode controller linked to said digital pulse-width modulator;
said digital pulse-width modulator and said dual sampling/clocking mode controller in combination being operable to control a low-power DC-DC switch-mode power supply operating at high constant switching frequency;
said digital controller producing an output voltage and being operable at low power consumption; and
said digital controller being capable of sampling the output voltage at a switching rate to provide fast transient response, said digital controller being further capable of undersampling the output voltage at a frequency lower than a switching frequency to reduce power consumption to a level less than the level of power consumption that occurs when said digital controller samples the output voltage at the switching rate.

15. The digital controller of claim 14, said digital controller being configured to assume a steady state mode and a dynamic mode and producing an output voltage that is capable of being sampled, said output voltage being sampled at a frequency lower than a switching frequency when said digital controller assumes the steady state mode, said output voltage being sampled at a switching rate when said digital controller assumes the dynamic mode.

16. The digital controller of claim 14, said digital pulse-width modulator being operable to vary a duty ratio of a pulse width modulated signal between a plurality of possible discrete values that over a plurality of switching periods and based on an output from the plurality of switching periods, an average duty ratio value is established, the average duty ratio value being equal to a high resolution digital control command.

17. The digital controller of claim 14, said digital pulse-width modulator using second-order multi-bit sigma-delta digital pulse-width modulation.

18. The digital controller of claim 14 further comprising:
said digital pulse-width modulator using second-order multi-bit sigma-delta digital pulse-width modulation; and
said digital controller including a dual-mode compensator for reducing power consumption and improving effective resolution in a steady state of the digital pulse-width modulator to improve response during a plurality of transient states.

19. The digital controller of claim 14 further comprising:
said digital pulse-width modulator using second-order multi-bit sigma-delta digital pulse-width modulation and including a delay line; and
said delay line including a digital programmable cell to enable frequency switching at different power stages.

20. The digital controller of claim 14 further comprising:
said digital pulse-width modulator using second-order multi-bit sigma-delta digital pulse-width modulation and including a delay line;
said delay line including a digital programmable cell to enable frequency switching at different power stages; and
an analog programmable delay cell and a ½ line plus 1 frequency regulator to allow synchronization with an external clock.

21. The digital controller of claim 14 wherein high frequency of operation occurs between about 1 and 5 MHz.

22. The digital controller of claim 14 wherein ultra-fast switching frequency occurs above about 10 MHz.

23. The digital controller of claim 14 wherein high resolution occurs that is resolution providing tight output voltage regulation without limit cycle oscillations.

24. The digital controller of claim 14 wherein low resolution occurs that is resolution of conventional counter based solutions at high frequencies, between about 1 and 5 MHz, having a resolution of less than 6 bits.

25. A method for controlling low power DC-DC switch mode power supplies at relatively high constant switching frequencies comprising:

undersampling in a steady state mode of a high resolution digital pulse-width modulator, said digital pulse-width modulator being linked to a dual sampling/clocking mode controller; and sampling at a switching rate during transients such that an effective resolution of the digital pulse-width modulator is relatively low.

26. The method of claim 25 wherein a high frequency of operation is between about 1 and 5 MHz.

27. The method of claim 25 wherein an ultra-fast switching frequency is above about 10 MHz.

28. The method of claim 25 wherein a high resolution is a resolution that provides tight output voltage regulation without limit cycle oscillations.

29. The method of claim 25 wherein a low resolution is a resolution of conventional counter based solutions that at high frequencies of between about 1 and 5 MHz is less than 6 bits.

30. The method of claim 25 further comprising using a second-order multi-bit sigma-delta principle with a dual-sampling compensator to achieve high frequency and low power consumption.

31. The method of claim 25 further comprising using a second-order multi-bit sigma-delta principle to eliminate tones from a DC-DC switch-mode power supply that is part of the digital pulse-width modulator.

32. The method of claim 25 further comprising:

basing the digital pulse-width modulator on a ring oscillator structure; and digitally controlling the frequency of the digital pulse-width modulator.

33. The digital controller of claim 17 further comprising using a mixed signal implementation to control the frequency of the digital pulse-width modulator based on a ring oscillator.

\* \* \* \* \*